US010861464B2

(12) United States Patent
Lin

(10) Patent No.: US 10,861,464 B2
(45) Date of Patent: Dec. 8, 2020

(54) ELECTRONIC APPARATUS HAVING INCREMENTAL ENROLLMENT UNIT AND METHOD THEREOF

(71) Applicant: ASUSTeK COMPUTER INC., Taipei (TW)

(72) Inventor: Hai-Hsing Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 126 days.

(21) Appl. No.: 16/140,860

(22) Filed: Sep. 25, 2018

(65) Prior Publication Data

US 2019/0096409 A1 Mar. 28, 2019

(30) Foreign Application Priority Data

Sep. 27, 2017 (CN) .......................... 2017 1 0889264

(51) Int. Cl.
*G10L 17/04* (2013.01)
*G10L 17/06* (2013.01)
*G10L 17/00* (2013.01)

(52) U.S. Cl.
CPC .............. *G10L 17/04* (2013.01); *G10L 17/00* (2013.01); *G10L 17/06* (2013.01)

(58) Field of Classification Search
None
See application file for complete search history.

(56) References Cited

U.S. PATENT DOCUMENTS

| 6,260,012 | B1 * | 7/2001 | Park ...................... H04M 1/271 |
| | | | 704/236 |
| 9,548,979 | B1 * | 1/2017 | Johnson .............. H04L 63/0861 |
| 9,990,926 | B1 * | 6/2018 | Pearce .................... G10L 15/05 |
| 10,013,983 | B1 * | 7/2018 | Johnson ............... H04W 12/08 |
| 10,032,451 | B1 * | 7/2018 | Mamkina ................ G10L 15/26 |
| 10,490,195 | B1 * | 11/2019 | Krishnamoorthy ..... G10L 13/00 |
| 2003/0036903 | A1 * | 2/2003 | Konopka ............. G10L 15/065 |
| | | | 704/249 |

(Continued)

FOREIGN PATENT DOCUMENTS

CN 102142254 A 8/2011
CN 106157959 A 11/2016

*Primary Examiner* — Jonathan C Kim
(74) *Attorney, Agent, or Firm* — McClure, Qualey & Rodack, LLP

(57) ABSTRACT

The present disclosure provides an electronic apparatus having an incremental enrollment unit and a method thereof. The electronic apparatus at least includes a microphone, a storage device, and a processor. The storage device stores a first screening rule, an enrollment database, and a first temporary storage library. The processor receives a command voice transmitted by the microphone, and compare the command voice with enrolled voices in the enrollment database. If determining that a similarity is larger than a threshold value, the processor stores the command voice as a first temporarily stored voice in the first temporary storage library. When a quantity of the first temporarily stored voices in the first temporary storage library is larger than a first predetermined value, the processor screens out a part of the first temporarily stored voices according to the first screening rule, so as to perform incremental enrollment.

10 Claims, 3 Drawing Sheets

(56) References Cited

U.S. PATENT DOCUMENTS

| | | | |
|---|---|---|---|
| 2003/0167169 A1* | 9/2003 | Lewis | G10L 15/063 |
| | | | 704/260 |
| 2008/0249774 A1* | 10/2008 | Kim | G10L 17/02 |
| | | | 704/250 |
| 2013/0311184 A1* | 11/2013 | Badavne | G10L 15/07 |
| | | | 704/250 |
| 2014/0092007 A1* | 4/2014 | Kim | H04N 21/2335 |
| | | | 345/156 |
| 2015/0379993 A1* | 12/2015 | Subhojit | G10L 15/06 |
| | | | 704/275 |
| 2016/0111084 A1* | 4/2016 | Bang | G10L 15/07 |
| | | | 704/251 |
| 2016/0217793 A1* | 7/2016 | Gorodetski | G10L 17/04 |
| 2017/0256255 A1* | 9/2017 | Bocklet | G06F 16/685 |
| 2018/0300468 A1* | 10/2018 | Lui | G06F 9/4451 |
| 2019/0378493 A1* | 12/2019 | Kim | G10L 15/25 |
| 2020/0051554 A1* | 2/2020 | Kim | G10L 15/18 |

* cited by examiner

ELECTRONIC APPARATUS HAVING INCREMENTAL ENROLLMENT UNIT AND METHOD THEREOF

CROSS-REFERENCE TO RELATED APPLICATION

This application claims the priority benefit of Chinese application serial No. 201710889264.0, filed on Sep. 27, 2017. The entirety of the above-mentioned patent application is hereby incorporated by reference herein and made a part of the specification.

BACKGROUND OF THE INVENTION

Field of the Invention

The present disclosure relates to an electronic apparatus and a method thereof, and more particularly, to an electronic apparatus with speaker system identification ability and a method thereof.

Description of the Related Art

With vigorous development of Artificial Intelligence (AI), more and more operators participate in the field of commercial robots, and try to design a robot product that interacts with people to provide convenient services. "speaker system" is a key technique for enhancing interactive ability of robots.

The technique "incremental enrollment" in the speaker system directly adds a command voice as an enrolled voice after determining that the command voice is similar to an enrolled voice. However, even if a similarity of the command voice is larger than a threshold value, a determination error may possibly occur. That is, some incorrect command voices are executed and stored. Therefore, after long term use, voiceprint features of an enrolled voice may possibly deviate to an incorrect direction and influence identification ability of a speaker system.

BRIEF SUMMARY OF THE INVENTION

One aspect of the present disclosure provides an electronic apparatus having an incremental enrollment unit, and the electronic apparatus includes a microphone, a storage device, and a processor. The microphone is configured to receive a command voice transmitted from outside. The storage device at least stores a first screening rule, an enrollment database, and a first temporary storage library, and the enrollment database stores at least one enrolled voice. The processor is respectively electrically connected to the microphone and the storage device, when receiving the command voice transmitted by the microphone, compares the command voice with the enrolled voice to obtain a first similarity score, and stores the command voice as a first temporarily stored voice in the first temporary storage library if the first similarity score is larger than a threshold value. When a quantity of first temporarily stored voices in the first temporary storage library is larger than a first predetermined value, the processor screens out at least one first temporarily stored voice in the first temporary storage library of which the first similarity scores are larger than a first comparison value as the first incremental enrolled voices according to the first screening rule, and stores the first incremental enrolled voices in enrollment database.

The other aspect of the present disclosure provides an incremental enrollment method that is applied to an electronic apparatus. The electronic apparatus includes a microphone, a storage device, and a processor, and the storage device at least stores a first screening rule, an enrollment database and a first temporary storage library. The enrollment database stores at least one enrolled voice. The method disclosed in the present disclosure performs the subsequent steps through the processor: receiving a command voice transmitted by the microphone; calculating a first similarity score of the command voice and the enrolled voice for the received command voice; storing the command voice as the first temporarily stored voice in the first temporary storage library if determining that the first similarity score is larger than a threshold value; screening out the first temporarily stored voices of which the first similarity scores are larger than a first comparison value according to the first screening rule if determining that a total quantity of the first temporarily stored voices in the first temporary storage library is larger than a first predetermined value; and storing screened first temporarily stored voices as the first incremental enrolled voices respectively, and storing the first incremental enrolled voices in the enrollment database.

In view of the above, the electronic apparatus disclosed in the present invention does not store the command voice as an enrolled voice directly after determining that a similarity of the command voice and an enrolled voice is larger than a threshold value, but firstly stores it as a first temporarily stored voice in the first temporary storage library, and after a quantity of first temporarily stored voices is larger than a first default value, screens out the first temporarily stored voices with larger first similarity scores according to the first screening rule, thereby not only efficiently excluding some incorrect stored voices, and enhancing identification precision of the speaker system.

BRIEF DESCRIPTION OF THE DRAWINGS

To make the foregoing and other objectives, features, advantages, and embodiments of the present invention be more clear and comprehensible, the accompanying drawings are described as follows.

DETAILED DESCRIPTION OF THE EMBODIMENTS

When an element is "connected" or "coupled" herein, it means that the element is "electrically connected" or "electrically coupled". "Connecting" or "coupling" can also mean that two or more elements operate or interact cooperatively. Furthermore, although terms such as "the first" and "the second" are used to describe different elements herein, the terms are only intended to distinguish elements or operations described with same technical terms. Unless the context clearly indicates, the terms neither indicate or imply a sequence or an order, nor limit the present invention.

The present disclosure provides an electronic apparatus having an incremental enrollment unit and a method thereof.

Figure 1:
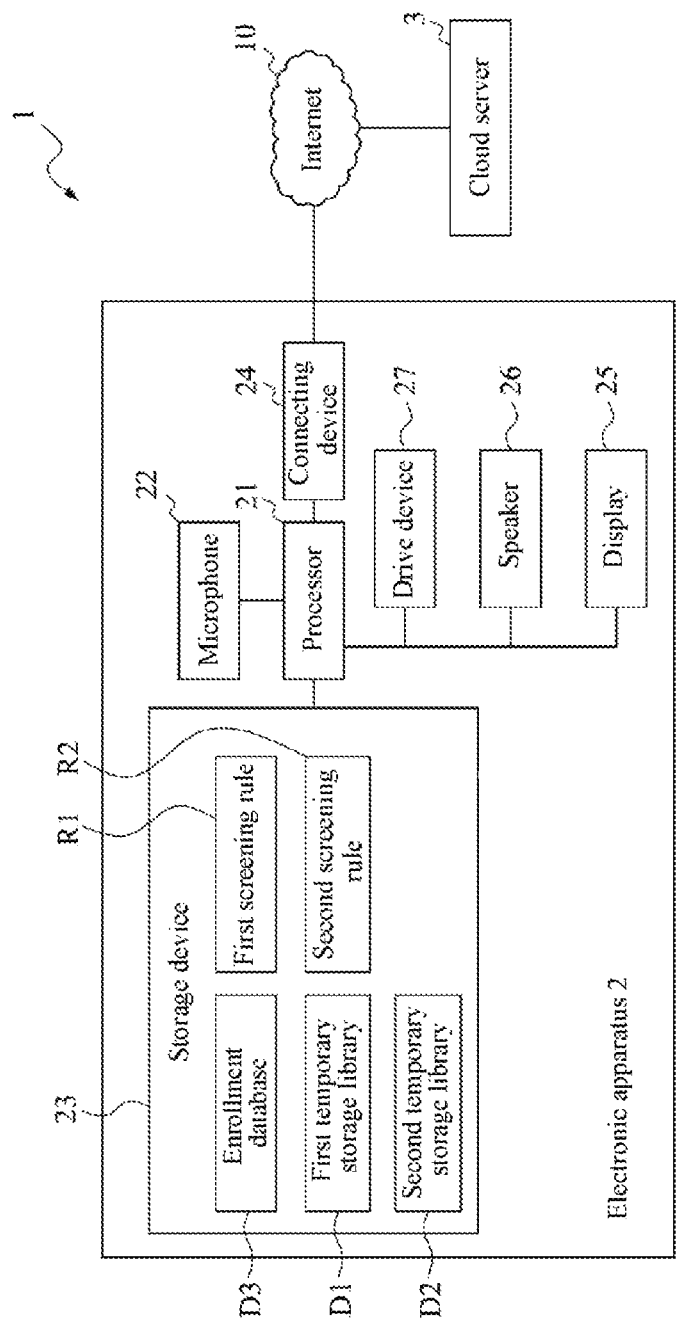
FIG. 1 is a schematic diagram of a speaker system applied to an electronic apparatus according to an embodiment of the present disclosure.
Figure 2:
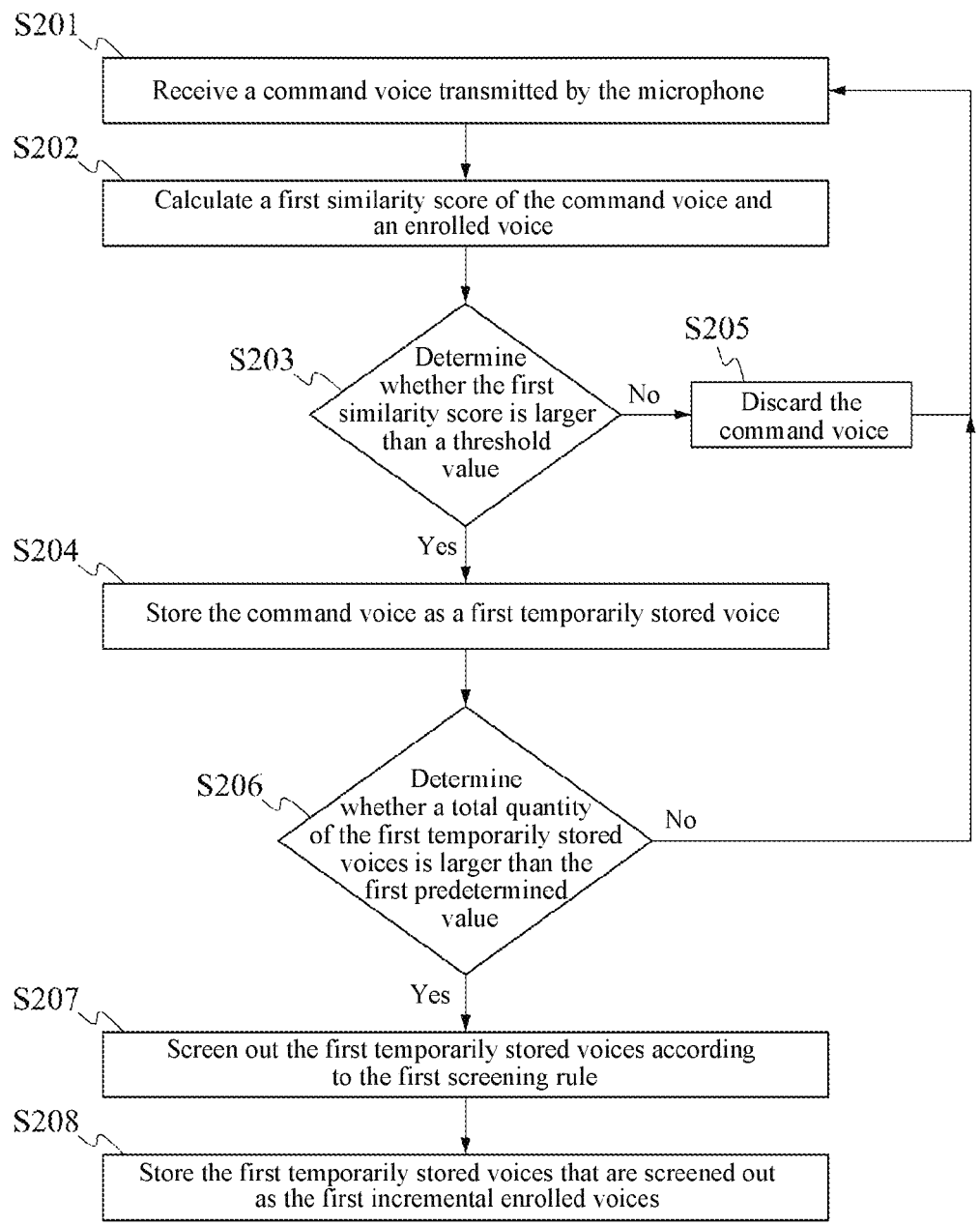
FIG. 2 is a flowchart of steps of the electronic apparatus performing screening with reference to a first screening rule according to an embodiment of the present disclosure.
Figure 3:
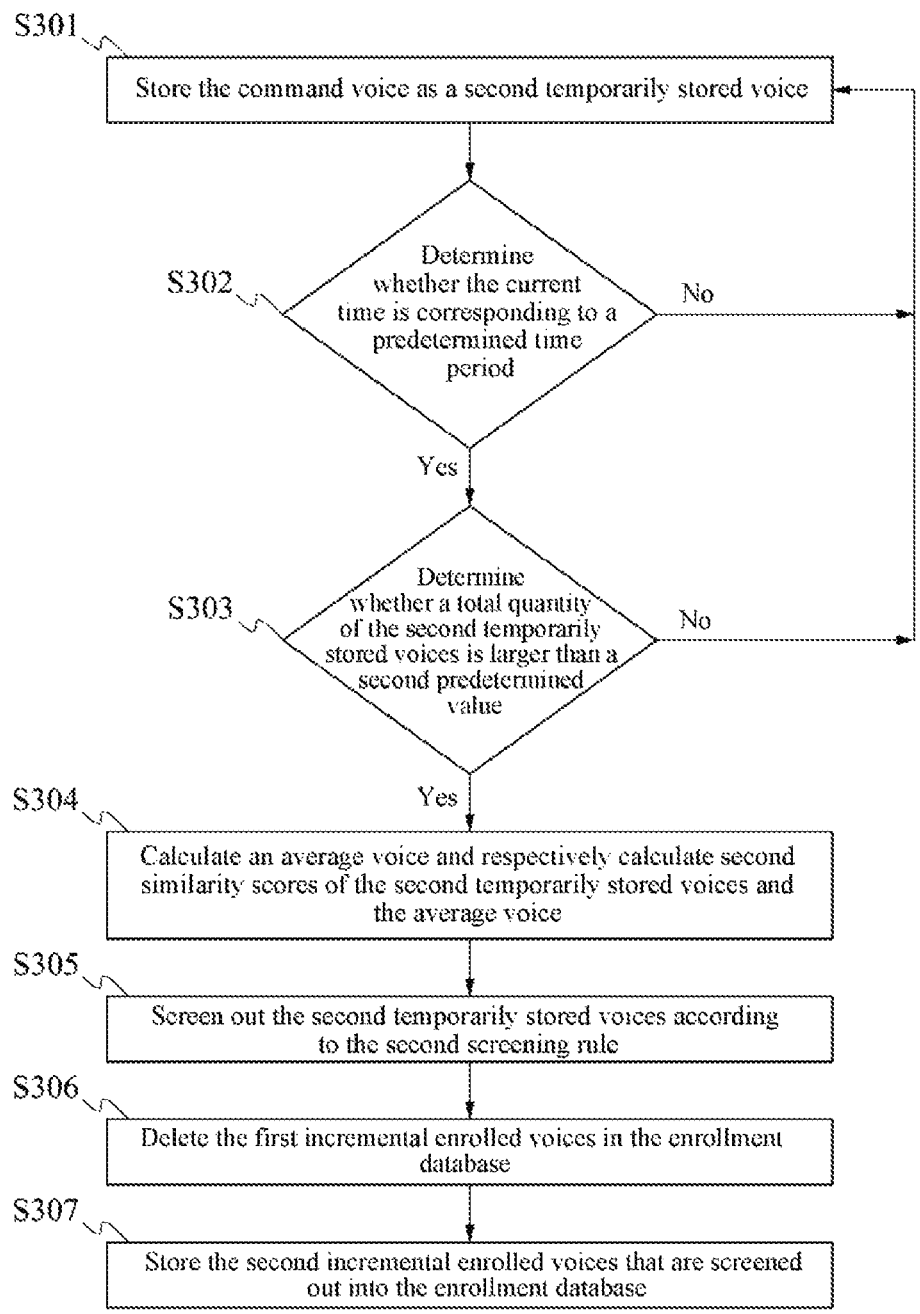
FIG. 3 is a flowchart of steps of the electronic apparatus performing screening with reference to a second screening rule according to an embodiment of the present disclosure.

Referring to FIG. 1, a speaker system 1 includes an electronic apparatus 2 and a cloud server 3. In an embodiment, the electronic apparatus 2 includes a voice identification system, for example, a robot apparatus with artificial intelligence and interactive functions, and includes a processor 21, a microphone 22, a storage device 23, a connecting device 24, a display 25, a speaker 26, and a drive device 27. In an embodiment, the display 25 is configured to display network data to be searched for, the speaker 26 is configured to play sound effects a user desires to listen to, and the drive device 27 is configured to displace the electronic apparatus 2.

The storage device 23 stores a first screening rule R1, a second screening rule R2, an enrollment database D3, a first temporary storage library D1, and a second temporary storage library D2. The enrollment database D3 stores at least one enrolled voice. The enrolled voice is a voice file recorded by a user in advance and stored in the electronic apparatus 2, and each user is corresponding to at least one enrolled voice. In an embodiment, the storage device 23 is a read-only memory, a flash memory, a floppy disk, a hard disk, an optical disk, a portable storage device, a tape, a database is accessed through a network, or a storage device that can be easily thought of by a person skilled in the art and have the same function. The enrollment database D3, the first temporary storage library D1, and the second temporary storage library D2 refer to different storage positions in the storage device 23.

The processor 21 is configured to perform various calculations. In an embodiment, the processor 21 is a microcontroller, a microprocessor, a digital signal processor, an application specific integrated circuit (ASIC) or a logic circuit. In an embodiment, the processor 21 is electrically connected to the microphone 22, the storage device 23, the connecting device 24, the display 25, the speaker 26, and the drive device 27 respectively. When receiving a command voice from the microphone 22, the processor 21 compares the command voice with an enrolled voice to obtain a first similarity score.

In a situation that the enrollment database D3 stores multiple enrolled voices (e.g., corresponding to a same user or corresponding to different users), the processor 21 compares the command voice with each piece of enrolled voice data one by one to obtain multiple comparison similarities, and then takes a highest similarity core as the first similarity score.

In a similar way, when the enrollment database D3 stores multiple enrolled voices of different users, the processor 21 compares the command voice with an average of enrolled voice data of each user one by one, and after obtaining multiple comparison similarities respectively, according to a highest similarity score, identify an identity of a corresponding user and store it as the "first similarity score". In an embodiment, the enrollment database D3 stores 10 enrolled voices of a user A, 5 enrolled voices of a user B, and 20 enrolled voices of a user C, and the processor 21 compares the command voice with an average of the enrolled voices of the user A, an average of the enrolled voices of the user B, and an average of the enrolled voices of the user C respectively.

After the processor 21 calculates the first similarity score, if the first similarity score is larger than a threshold value, it represents that the electronic apparatus 2 determines that the command voice is from a correct user corresponding to the enrolled voice (since the electronic apparatus 2 may possibly be used by multiple users at the same time, the following is about "the same user" to be distinguished from other users or unenrolled strangers). At this time, the processor 21 stores the command voice as a first temporarily stored voice in the first temporary storage library D1. When a quantity of the first temporarily stored voices in the first temporary storage library D1 that are identified to be from the same user is larger than a predetermined value (in an embodiment, 10), the processor 21 screens out at least one first temporarily stored voice in the first temporary storage library D1 of which the first similarity scores are larger than a first comparison value according to the first screening rule R1.

In an embodiment, the first screening rule R1 calculates an average of all the first similarity scores that are identified to be from the same user in the first temporary storage library D1 as the first comparison value, and only screens out the first temporarily stored voices of which the first similarity scores are larger than the first comparison value (that is, an average of the first similarity scores). The processor 21 adds the first temporarily stored voices that are screened out and identified to be from the same user as first incremental enrolled voices and stores the first incremental enrolled voices in the enrollment database D3. In an embodiment, an average score of the first similarity scores of the 10 first temporarily stored voices is 6, and the processor 21 adds the four first temporarily stored voices of which the first similarity scores are larger than 6 as first incremental enrolled voices (the original enrolled voice is still remained). In an embodiment, the first comparison value in the first screening rule R1 is not limited to "an average" and may also be designed as "a median" or calculated through a weighed special formula.

The technology of the present disclosure performs a screening action through the first screening rule R1 before recording the first temporarily stored voice as the first incremental enrolled voice. Accordingly, even if a few incorrect command voices are stored as the first temporarily stored voices, they will be discarded in a subsequent screening process (in an embodiment, calculating to determine whether they are larger than a whole average), thereby ensuring identification ability of the "incremental enrollment" technology.

The foregoing description describes performing incremental enrollment on voices that are identified to be from "the same user" (that is, the user A). If another user gives a command voice to the electronic apparatus 2 (in an embodiment, identified to be the voice of the user B), the electronic apparatus 2 will perform the same foregoing steps independently to perform incremental enrollment. Therefore, the quantities of the first temporarily stored voices of different users will not be mixed and superposed.

To explain the operation manner of the present disclosure more specifically, the following describes the steps that need to be performed by the processor when performing incremental enrollment, including steps S201-S208.

In step S201, the processor 21 receives a command voice transmitted by the microphone 22, and the command voice is triggered voice or an action command voice.

In step S202, the processor 21 calculates a first similarity score of the command voice and an enrolled voice for the received command voice. In an embodiment, the processor compares voiceprint features of the command voice and the enrolled voice, thereby calculating the first similarity core.

In step S203, the processor 21 determines whether the first similarity score is larger than the threshold value. If the first similarity score is larger than the threshold value, step S204 is performed, and otherwise, step S205 is performed to discard the command voice, and step S201 is returned to. In an embodiment, the threshold value is pre-stored in the storage device 23, and is adjustable.

If, in the foregoing step S203, the processor 21 determines that the first similarity is larger than the threshold value, in step S204, the processor 21 further stores the command voice as a first temporarily stored voice in the first temporary storage library D1, and at the same time, stores the first similarity score that has been calculated in the first temporary storage library D1. In step S206, the processor 21 determines whether a total quantity of the first temporarily stored voices in the first temporary storage library D1 that are identified to be from the same user is larger than the first predetermined value (in an embodiment, 10). If the total quantity is larger than the first predetermined value, step S207 is performed, and otherwise, S201 is returned to. The first predetermined value is also pre-stored in the storage device 23, or also adjustable by the user.

In step S207, the processor 21 screens out the first temporarily stored voices of which the first similarity scores are larger than a first comparison value according to the first screening rule. In an embodiment, the processor 21 calculates an average (in an embodiment, 6) of the first similarity scores as the first comparison value, only remains the first temporarily stored voices of which the first similarity scores are larger than the first comparison value (that is, an average of the first similarity scores, and in an embodiment, 6.5 and 7), and deletes the others. In step S208, the first temporarily stored voices that are screened out are stored as the first incremental enrolled voices, and stored in the enrollment database D3, thereby finishing incremental enrollment.

As stated above, the storage device 23 further stores a second screening rule R2 and a second temporary storage library D2, which further enhances identification ability of the speaker system 1 or the electronic apparatus 2. After storing the command voice as the first temporarily stored voice, the processor 21 also stores the command voice as a second temporarily stored voice in the second temporary storage library D2, and in a situation that a quantity of the second temporarily stored voices in the second temporary storage library D2 that are identified to be from the same user is larger than a second predetermined value (in an embodiment, 100), the processor 21 firstly calculates an average voice of all the second temporarily stored voices, and then compares the second temporarily stored voices with the average voice respectively, so as to obtain second similarity scores respectively.

After calculating the second similarity scores of all the second temporarily stored voices, the processor 21 screens out at least one second temporarily stored voice in the second temporary storage library D2 of which the second similarity scores are larger than a second comparison value according to the second screening rule R2. In an embodiment, the screening manner of the second screening rule R2 is the same as the screening manner of the first screening rule R1, an average of all the second similarity scores in the second temporary storage library is calculated as the second comparison value, and the second temporarily stored voices of which the second similarity scores are larger than the second comparison value (that is, an average of all the second similarity scores) are screened out. However, the calculation manner of the second screening rule R2 is not limited thereby, and also is changed as a median or a preset formula.

The processor 21 uses the second temporarily stored voices that are screened out as the second incremental enrollment voices, and stores them in the enrollment database D3, so as to replace the original first incremental enrolled voices.

The second screening rule R2 is used to further strengthen identification ability of the speaker system 1 or the electronic apparatus 2, so as to efficiently eliminate incorrect voices that may be mixed. Therefore, the second predetermined value must be larger than a first predetermined value. To avoid a situation that a common processor 21 does not calculate all second similarity scores in a short time period for the second predetermined value is too large, in an embodiment, in a situation that the processor 21 determines that the current time is corresponding to a predetermined time period (in an embodiment, 3 am) in the storage device 23, the processor 21 begins to determine whether a quantity of the second temporarily stored voices in the second temporary storage library D2 is larger than the second predetermined value, so as to prevent the calculation time of the processor 21 from being too long and influencing user experience.

After the processor 21 determines that the first similarity score of the command voice is larger than the threshold value, the step of further screening out a voice according to the second screening rule R2 includes steps S301-S307.

In step S301, the processor 21 stores the command voice as a second temporarily stored voice in the second temporary storage library D2 after determining that the similarity of the command voice and an enrolled voice is larger than the threshold value.

In step S302, the processor 21 determines whether the current time is corresponding to a predetermined time period, if the current time is corresponding to a predetermined time period, performs step S303, and otherwise, returns to step S301 to determine whether a new command voice is received.

In step S303, once it is determined that the current time is identical with the predetermined time period, the processor 21 determines whether a total quantity of the second temporarily stored voices identified to be from the same user is larger than a second predetermined value (in an embodiment, 100). If the total quantity of the second temporarily stored voices identified to be from the same user is larger than a second predetermined value, it represents that the condition for performing the second screening is satisfied, and step S304 is performed; and otherwise, S301 is returned to receive a new command voice and store the new command voice as the second temporarily stored voice.

In step S304, the processor 21 calculates an average voice of all the second temporarily stored voices, and respectively calculates second similarity scores of the second temporarily stored voices and an average voice. In step S305, according to the second screening rule R2, the second temporarily stored voices of which the second similarity scores are larger than a second comparison value and which are identified to be from the same user are screened out. In an embodiment, the processor 21 firstly calculates an average of all the second similarity scores as the second comparison value and only the second temporarily stored voices of which the second similarity scores are larger than the second comparison value (that is, the average of all the second similarity scores) are remained and stored as second incremental enrolled voices, and all the second temporarily stored voices are deleted. In an embodiment, the second similarity scores of only 40 second temporarily stored voices in 100 second temporarily stored voices are larger than the average, that is, the 40 second temporarily stored voices are screened out as the second incremental enrolled voices, and the 100 second temporarily stored voices are deleted.

In step S306, the processor 21 deletes the first incremental enrolled voices in the enrollment database D3. Finally, step S307 is performed to store all the second incremental enrolled voices that are screened out into the enrollment database D3.

The technique in the present disclosure can be applied to "text dependent" or "text independent". That is, the command voice refers to a triggered voice or an action command voice, and according to the technique in the present disclosure, the electronic apparatus 2 improves identification precision of identifying a triggered voice or an action command voice. If the technique is a "text dependent" technique, after giving a triggered voice, a user still needs to deliver an action command, so that the electronic apparatus 2 identifies and performs a relevant action. Therefore, two storage devices 23 are provided in the electronic apparatus respectively, so as to respectively store identification data corresponding to the triggered voice and the action command voice.

In an embodiment, the system in the present disclosure is further configured to determine an identity of a user after saying a text dependent keyword, receive a command voice in a predetermined time period, and enroll the command voice as the identity of the text dependent user. Referring to FIG. 1, in an embodiment, the enrolled voices in the enrollment database D3 is distinguished as text dependent keyword voices or text independent command voices. In an embodiment, the electronic apparatus 2 firstly receives a wake-up voice given by a user. If the processor 21 determines that the wake-up voice is corresponding to a text dependent keyword voice, and the speaker system is used to determine the wake-up voice, then the electronic apparatus 2 identifies the identity of the user.

In view of the above, after determining the identity of the user, the processor 21 begins timing. If further receiving a command voice (in an embodiment, an action command "query the TV program timetable for me") in a predetermined time period (in an embodiment, 15 seconds), the processor 21 will regard the command voice received in the predetermined time period as a new text independent command voice, and enroll it in the enrollment database D3, so as to become the text independent command voice corresponding to the identity of the user. On the contrary, if no command voice is received in the predetermined time period, the electronic apparatus 2 performs no actions.

The speaker identification function and relevant software and hardware in the present disclosure is disposed in the electronic apparatus 2, and the electronic apparatus 2 also is connected to the cloud server 3 through the Internet 10, so as to perform identification.

Although the embodiments of the present invention are disclosed above, the embodiments are not intended to limit the present invention. A person skilled in the art can make some changes and modifications without departing from the spirit and scope of the present invention. The protection scope of the present invention should depend on the claims.

What is claimed is:

1. An electronic apparatus having an incremental enrollment unit, comprising:
    a microphone, configured to receive command voices transmitted from outside;
    a storage device, configured to at least store a first screening rule, an enrollment database, and a first temporary storage library, the enrollment database storing at least one enrolled voice; and
    a processor, electrically connected to the microphone and the storage device respectively, and configured to compare the command voices and the enrolled voice to obtain first similarity scores when receiving the command voices transmitted by the microphone; store the command voices as first temporarily stored voices in the first temporary storage library if the first similarity scores are larger than a threshold value; and according to the first screening rule, screen out at least one of the first temporarily stored voices in the first temporary storage library, of which the first similarity scores are larger than a first comparison value, as first incremental enrolled voices when a quantity of the first temporarily stored voices in the first temporary storage library is larger than a first predetermined value, and store the first incremental enrolled voices in the enrollment database;
    wherein the first comparison value is an average of all the first similarity scores in the first temporary storage library;
    wherein the storage device further stores a second screening rule and a second temporary storage library, and the processor is further configured to store the command voices as second temporarily stored voices in the second temporary storage library, when a quantity of second temporarily stored voices in the second temporary storage library is larger than a second predetermined value, the processor firstly calculates an average voice of the second temporarily stored voices, then compares each of the second temporarily stored voices with the average voice respectively, so as to obtain second similarity scores respectively, and according to the second screening rule, screens out at least one of the second temporarily stored voices in the second temporary storage library, of which the second similarity scores are larger than a second comparison value, as second incremental enrolled voices, and storing the second incremental enrolled voices in the enrollment database, and deletes the first incremental enrolled voices.

2. The electronic apparatus according to claim 1, wherein the second comparison value is an average of all the second similarity scores in the second temporary storage library.

3. The electronic apparatus according to claim 2, wherein the second predetermined value is larger than the first predetermined value.

4. The electronic apparatus according to claim 3, wherein in a situation that the processor determines current time is corresponding to a predetermined time period, the processor begins to determine whether the quantity of the second temporarily stored voices in the second temporary storage library is larger than the second predetermined value.

5. The electronic apparatus according to claim 1, wherein the enrolled voices are classified as text dependent keyword voices and text independent command voices.

6. The electronic apparatus according to claim 5, wherein the electronic apparatus receives a wake-up voice, if the processor determines that the wake-up voice is corresponding to the text dependent keyword voice and identify an identity, and upon receipt of the wake-up voice, the processor further receives the command voice in a predetermined time period, the processor regards the command voice as the new text independent command voice of the identity, and enroll the command voice in the enrollment database.

7. An incremental enrollment method, applied to an electronic apparatus, the electronic apparatus comprising a microphone, a storage device, and a processor, and furthermore, the storage device at least storing a first screening rule, an enrollment database, and a first temporary storage library, and the enrollment database storing at least one enrolled voice, and the method performing following steps through the processor:

receiving command voices transmitted by the microphone;

calculating first similarity scores of the command voices and the enrolled voice for the command voices;

storing the command voices as first temporarily stored voices in the first temporary storage library if the processor determines that the first similarity scores are larger than a threshold value;

screening out the first temporarily stored voices of which the first similarity scores are larger than a first comparison value according to the first screening rule if the processor determines that a total quantity of the first temporarily stored voices in the first temporary storage library is larger than a first predetermined value; and storing, by the processor, the screened first temporarily stored voices as first incremental enrolled voices respectively, and storing the first incremental enrolled voices into the enrollment database;

wherein the first comparison value is an average of all the first similarity scores in the first temporary storage library;

wherein the storage device further stores a second screening rule and a second temporary storage library and the processor is further configured to perform following steps:

storing the command voices as second temporarily stored voices in the second temporary storage library after determining similarities of the command voices and the enrolled voice are larger than the threshold value;

calculating an average voice of the second temporarily stored voices when determining a total quantity of the second temporarily stored voices is larger than a second predetermined value;

calculating second similarity scores of each of the second temporarily stored voices and the average voice respectively;

screening out the second temporarily stored voices of which the second similarity scores are larger than a second comparison value according to the second screening rule, and storing the second temporarily stored voices as second incremental enrolled voices; and deleting the first incremental enrolled voices in the enrollment database, and storing the second incremental enrollment voices in the enrollment database.

8. The method according to claim 7, wherein the second comparison value is an average of all the second similarity scores in the second temporary storage library.

9. The method according to claim 8, wherein the second predetermined value is larger than the first predetermined value.

10. The method according to claim 9, further comprising beginning to determine whether a total quantity of the second temporarily stored voices in the second temporary storage library is larger than the second predetermined value when determining that current time is corresponding to a predetermined time period.

* * * * *